June 17, 1941. G. STEINLEIN 2,246,019
TWO STROKE INTERNAL COMBUSTION ENGINE OPERATING WITH FUEL INJECTION
Filed Jan. 19, 1939
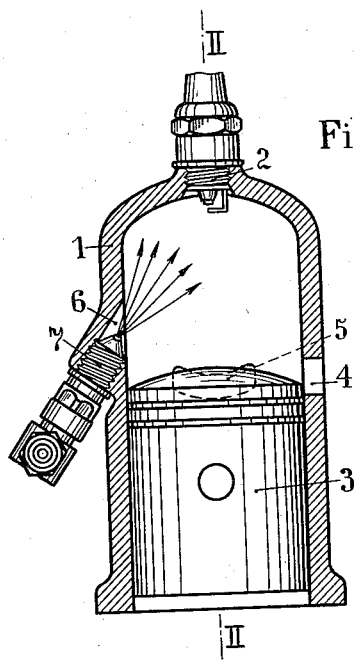
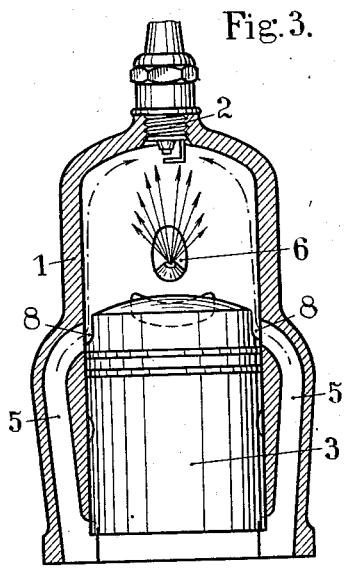
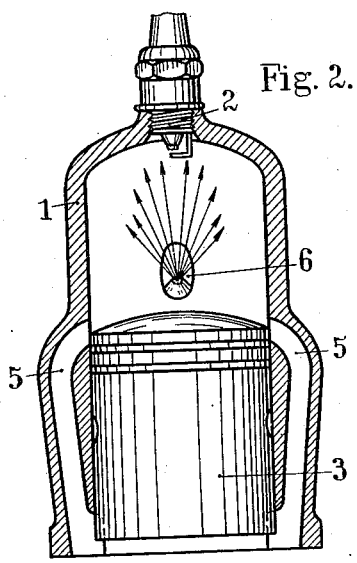
Inventor
Gustav Steinlein
ATTORNEYS.

Patented June 17, 1941

2,246,019

UNITED STATES PATENT OFFICE 2,246,019

TWO STROKE INTERNAL COMBUSTION ENGINE OPERATING WITH FUEL INJECTION

Gustav Steinlein, Mainberg, near Schweinfurt, Germany

Application January 19, 1939, Serial No. 251,734
In Germany January 26, 1938

2 Claims. (Cl. 123—32)

The present invention relates to two stroke internal combustion engines operating with fuel injection and has for its main object to improve the scavenging of the cylinders and the fuel consumption with a view to obtain in a two stroke combustion engine a fuel consumption approximately equal to that of a four stroke internal combustion engine of the same power.

The relatively high fuel consumption experienced hitherto, in connection with two stroke motors supplied with fuel by a carburettor or by spraying is substantially due to the fact, that a large amount of the fuel does not reach the combustion space in a form most suitable for combustion and that, especially in connection with large cylinder contents, the burnable fresh gases or fresh gas mixture respectively are mixed with the waste or burnt gases remaining in the cylinder in such a ratio that a combustion free of objection is impossible. Also, owing to an insufficient guidance of the gas, fresh gases reach the exhaust without being utilized.

In spite of the fact that attempts have been made to reduce as far as possible the losses due to the above mentioned causes, yet it has been found that unsatisfactory results have been obtained in connection with ordinary two stroke motors tending to render the fuel consumption of the latter equal to that of a four stroke motor.

It is well known that with larger cylinder contents the ratios of fuel consumption between the two types of motors are rendered progressively worse, and that there are serious disadvantages connected therewith, as for instance uncontrollable heat development and a heavy deposit of carbon.

By means of the present invention, the drawbacks above referred to and hitherto inherent in two stroke internal combustion engines operating with fuel injection and separate ignition are substantially obviated.

In the accompanying drawing two embodiments of the invention are shown by way of example.

In this drawing:

Fig. 1 shows a longitudinal section through the cylinder the piston of which is shown in its position near the lower dead centre; this cylinder is provided with a spraying or injecting device according to the invention, Fig. 2 is a longitudinal section on the line II—II of Fig. 1 through the cylinder, and Fig. 3 shows a modified construction of the device according to the invention, illustrating a channel at the piston head for the introduction of fresh air.

Like numerals designate like parts throughout all figures of the drawing.

The cylinder 1 is provided with a sparking plug 2. The piston 3 is shown in a position in which the exhaust port 4 is still open and the fresh air ports 5 also are opened. The port 6 for the fuel introduction is arranged approximately at the level of the exhaust port 4. The fuel injecting device 7 is obliquely arranged in the cylinder wall 1, and desirably has its longitudinal axis intersecting the longitudinal axis of the cylinder 1 at about the inner wall of the cylinder head so that, as shown in the drawing by arrows, the fuel is directed against the cylinder head, where it is mixed with the fresh air.

The fresh air may at the point of admission into the cylinder be received by a leading channel 8 which is formed at the piston head by means of a restriction of the piston surface as shown in Fig. 3. The fresh air is thereby first guided substantially parallel to the cylinder wall towards the cylinder head, as shown by arrows in Fig. 3 and is, after being reversed and swirled, used to discharge the waste gases from top to bottom.

The fuel is injected as shown in a direction opposite to that of the downwardly deflected fresh air in the cylinder head, and the fuel injection is started directly after the beginning of the above-mentioned swirling to effect intimate mixture of the fuel with the fresh air.

As shown in the drawing, the fuel injection begins in the lower dead center position of the piston or near said piston after the burnt and waste gases are substantially discharged from the cylinder and fresh air flows freely into the cylinder, and while the exhaust port is still open and the cylinder pressure is still low. This injection of the fuel during the low pressure phase of the engine permits the use of a fuel injection device of the low pressure type, and eliminates the necessity of expensive high pressure fuel pumps, and special injection nozzles. The fuel jet is thereby directed against the air current without any particular complicated means, to effect a thorough mixture of the fresh air and fuel.

In connection with the smaller cylinders, the short length of the injection jet as a rule is injurious. However, the present invention allows utilization of the total stroke period of the piston as the fuel injection period. The production of the mixture may in this manner also be effected by vaporization of the fuel, due to the fact that the time of the total stroke is available. The point of time of the injection may moreover be so chosen that no fuel will reach the exhaust ports.

In counter-distinction to the usual injection from the top towards the bottom, the injection in an upward direction and in opposition to the direction of the downwardly deflected flow of the fresh air in accordance with the present invention has the further advantage that the fuel is eventually deposited only in the cylinder head, where it is vaporized by the high temperature prevailing at said head. If injected from above, the fuel is deposited on the upper surface of the piston, so that the cylinder walls are moistened by said fuel. Such an arrangement is disadvantageous because of the wear to which the cylinder walls will be subjected.

The advantages of the present invention, due to the novel fuel injection method and construction as described, may be further enhanced particularly in connection with larger cylinder units by providing additional fresh air charging pumps to quantitatively enlarge the charge of fresh air besides the crank case pump. By such means, complete utilization of the larger cylinder contents is rendered possible by the fact that an excess of scavenging means is provided, by which the larger cylinder volumes may be satisfactorily scavenged.

Also by means of the present invention, a waste of fuel is easily prevented, and the fuel consumption easily controlled, whereas a considerable waste of fuel is associated with motors provided with carburetors.

The details of the machine according to the invention may, of course, be changed without departing from the spirit of the invention.

I claim:

1. In a two-stroke cycle internal combustion engine of the type provided with a spark ignition, the combination comprising a cylinder and a piston reciprocable therein, said cylinder having a pair of air inlet ports arranged substantially diametrically near the end of the power stroke of said piston, and controlled by said piston as to be uncovered thereby near the end of its power stroke, means on said piston head for directing the stream of air from said inlets along and substantially parallel to the cylinder walls towards the cylinder head and towards each other where they form a turbulent zone, an exhaust port between the two inlets disposed a short distance above the dead center position of the piston head at the end of its power stroke, and controlled by said piston, and means for injecting fuel into said cylinder from the side thereof diametrically opposite to and at a level substantially near said exhaust port and in a direction inclined towards said cylinder head, whereby the injected fuel moves counter-current to the descending turbulent zone of air and becomes thoroughly mixed therewith.

2. The method of scavenging the cylinder of a two stroke cycle internal combustion engine having a piston and cylinder, and forming a combustible mixture in said cylinder, said method comprising uncovering an exhaust port when the piston is near the end of its power stroke, immediately thereafter admitting currents of air to the cylinder substantially in the plane of said exhaust port and directing them toward the cylinder head along diametrically opposite sides of the cylinder and substantially equidistant from the exhaust port, whereby said currents meet at the cylinder head, have their kinetic energy reduced, and form a stratum of air across the cylinder, of progressively increasing thickness and moving toward the exhaust port to force out the exhaust gases, and injecting fuel on the side of the cylinder diametrically opposite to the exhaust port from a point substantially in the plane of the exhaust port, between said currents of air, in a direction toward the cylinder head and inclined with respect to the cylinder axis, while the exhaust port is still open, whereby the injected fuel moving toward the cylinder head becomes intimately mixed with the stratum of air moving toward the exhaust port.

GUSTAV STEINLEIN.